US006943825B2

United States Patent
Silvester

(10) Patent No.: US 6,943,825 B2
(45) Date of Patent: Sep. 13, 2005

(54) METHOD AND APPARATUS FOR ASSOCIATING MULTIMEDIA INFORMATION WITH LOCATION INFORMATION

(75) Inventor: Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 563 days.

(21) Appl. No.: 10/017,723

(22) Filed: Dec. 14, 2001

(65) Prior Publication Data

US 2003/0112332 A1 Jun. 19, 2003

(51) Int. Cl.$^7$ ............................................... H04N 7/18
(52) U.S. Cl. ........................ 348/113; 701/213; 396/429
(58) Field of Search ..................... 348/113, 116–119, 348/143, 231.9; 701/213; 707/100; 396/429

(56) References Cited

U.S. PATENT DOCUMENTS

| | | | | |
|---|---|---|---|---|
| 5,953,528 A | * | 9/1999 | Sullivan | 707/100 |
| 6,525,768 B2 | * | 2/2003 | Obradovich | 348/231.99 |
| 6,591,068 B1 | * | 7/2003 | Dietz | 396/429 |
| 6,604,049 B2 | * | 8/2003 | Yokota | 701/213 |

OTHER PUBLICATIONS

GeoSpatial Experts, "Ricoh Pro G3 GPS Camera", downloaded from http://www.geospatialexperts.com/ricoh.html on Apr. 4, 2005, 3 pages.

DCViews, "The Ricoh RDC–i700G adds GPS Functionality to an already feature packed Digital Camera", Feb. 26, 2003, downloaded from http://www.dcviews.com/press/Ricoh_RDC–i700G.htm on Apr. 4, 2005, 3 pages.

GEOsnapper, "GPS Photography", downloaded from http://www.geosnapper.com/ on Apr. 4, 2005, 2 pages.

MobileMag, "Au Exhibits GPS Camera–Equipped Mobile Phone that Mails Map Info", May 27, 2002, downloaded from http://www.mobilemag.com/content/100/104/C1119/ on Apr. 4, 2005, 2 pages.

* cited by examiner

*Primary Examiner*—Gims Philippe
(74) *Attorney, Agent, or Firm*—Blakely, Sokoloff, Taylor & Zafman LLP

(57) ABSTRACT

In accordance with an embodiment of the present invention, a system includes an input component to receive multimedia data and a locator to provide a place stamp associated with the multimedia data. For example, a camera may include a global positioning system to provide a place stamp associated with a picture to indicate the location at which the picture was taken.

5 Claims, 2 Drawing Sheets

METHOD AND APPARATUS FOR ASSOCIATING MULTIMEDIA INFORMATION WITH LOCATION INFORMATION

The present invention relates to computer systems and more particularly to providing an electronic device with the ability to generate and store location information along with the multimedia information with which it is associated.

BACKGROUND

Computer systems are becoming increasingly pervasive in our society, including everything from small handheld electronic devices, such as personal data assistants and cellular phones, to application-specific electronic devices, such as set-top boxes, digital cameras, and other consumer electronics, to medium-sized mobile systems such as notebook, sub-notebook, and tablet computers, to desktop systems, workstations, and servers. Computer systems may take many different forms, providing many different services for a user. One type of service is the recording of multimedia data, including, for example, video and audio data. Computer systems that provide this type of service may include, for example, cellular phones, digital cameras, video cameras (or camcorders), etc.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, an electronic device includes an input component to receive multimedia data and a locator to provide a place stamp associated with the multimedia data. A place stamp provides an indication of the location at which the multimedia data was received. For example, a camera may include a global positioning system (GPS) component to provide a place stamp associated with a picture to indicate the location at which the picture was taken.

The picture and associated place stamp may be downloaded from the camera to a computer system, whereupon the computer system may convert the place stamp from a first format into a second format. The first format may include, for example, latitude and longitude information, and the second format may include nomenclature information, such as a city name.

A more detailed description of embodiments of the present invention, including various configurations and implementations, is provided below.

Figure 1:
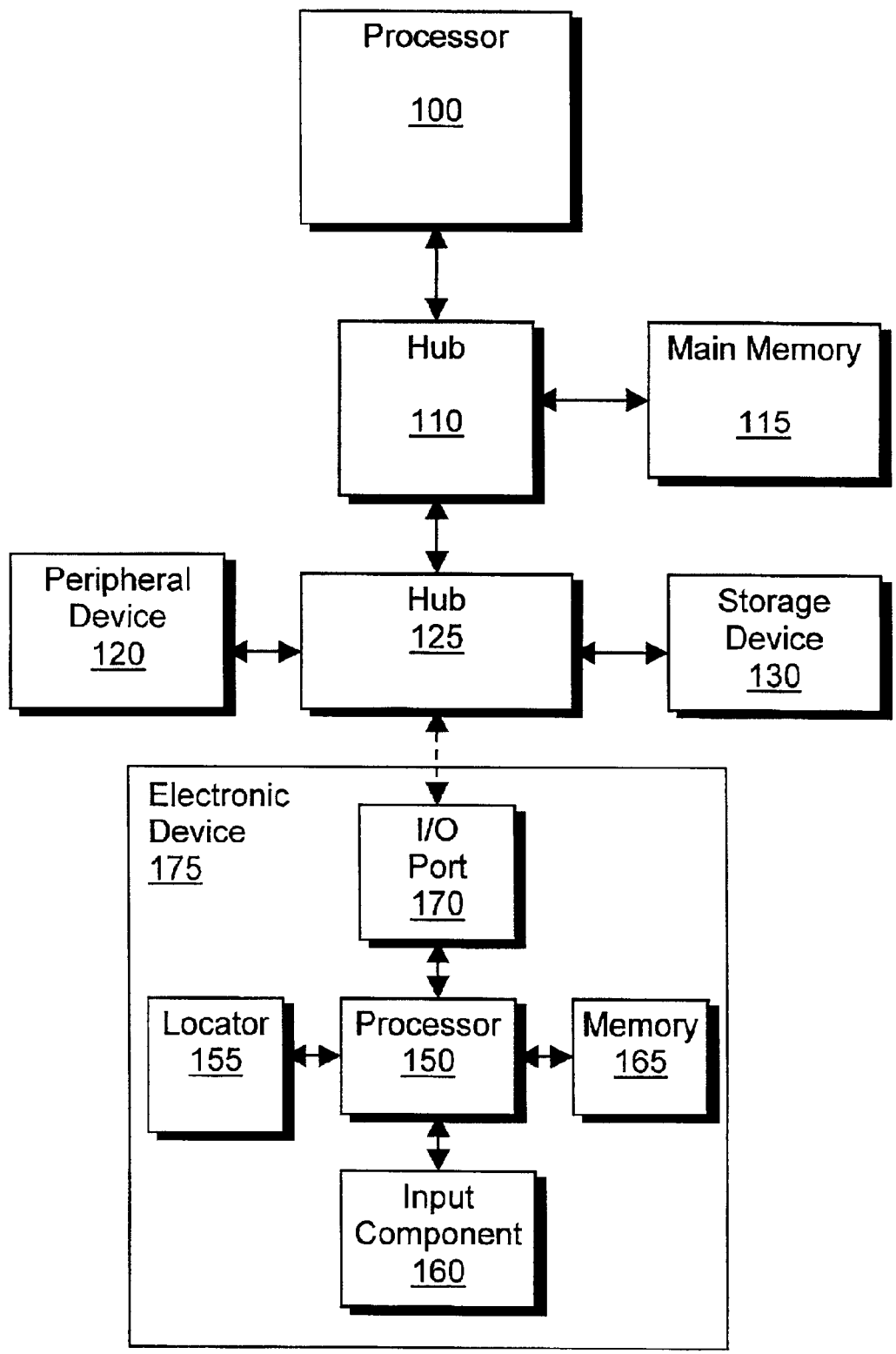
FIG. 1 includes a computer system formed in accordance with an embodiment of the present invention.

FIG. 1 includes electronic device 175 that may be formed in accordance with an embodiment of the present invention. As shown, electronic device 175 may include processor 150 coupled to locator 155, input/output port 170, memory 165, and input component 160.

For one embodiment of the present invention, locator 155 may include a GPS. Memory 165 may include any machine-readable medium such as a magnetic disk (e.g. a hard drive or floppy disk), an optical disk (e.g. a CD or DVD), or a semiconductor device (e.g. Flash, EPROM, or RAM). Input component 160 may include any of a number of devices depending on the function of electronic device 175. For example, for an embodiment in which electronic device 175 is a camera, either a digital (still) camera, video camera, or a combination of the two, input component 160 may include a lens. For an embodiment in which electronic device 175 is a cellular phone, input component 160 may include a microphone or a numeric keypad.

As shown in FIG. 1, electronic device 175 may be coupled to a computer system via port 170. The computer system may include a processor 100. Processor 100 may communicate with main memory 115 and hub 125 via hub 110. Hub 125 may couple peripheral device 120, storage device 130, and electronic device 175 (when coupled to the computer system) to hub 110.

Peripheral device 120 may include one or more devices such as audio or video devices. Note that in accordance with alternate embodiments of the present invention, computer systems may include more or fewer components than those shown in FIG. 1. Note, also, that the components of FIG. 1 may be partitioned differently. For example, multiple components may be integrated into a single component, and single components may be divided into multiple components. Note that the term "processor" may be used herein to refer to one or more of a central processing unit, a processor of a symmetric or asymmetric multiprocessing system, a digital signal processor, a micro-controller, etc.

A method of an embodiment of the present invention may be implemented by the computer system of FIG. 1 programmed to execute various steps of the method. This program may reside, at least in part, in any machine-readable medium such as a magnetic disk, an optical disk, a semiconductor device, or a carrier wave (e.g. an electrical or wireless data signal), all of which are collectively represented by storage devices 130 and 165 of FIG. 1.

Figure 2:
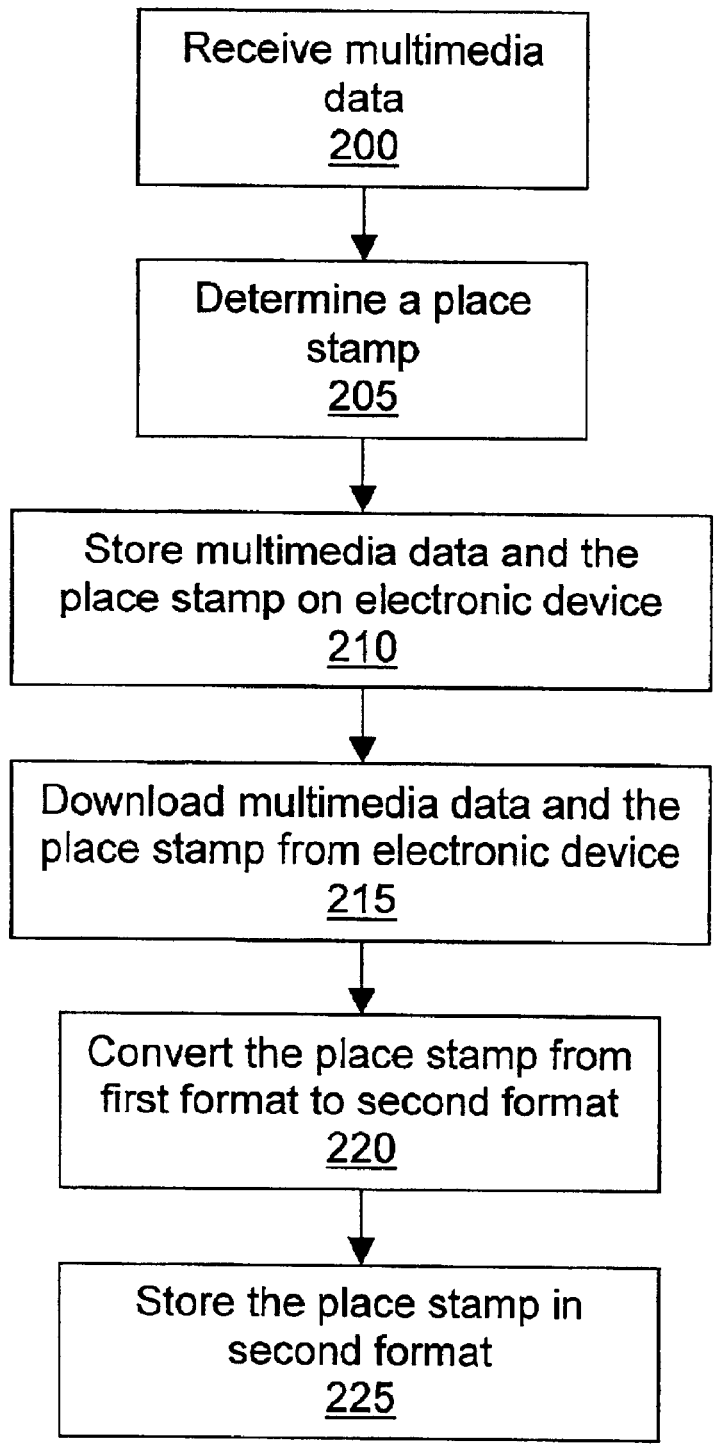
FIG. 2 includes a flow chart showing a method of an embodiment of the present invention.

FIG. 2 includes a flow chart showing a method of an embodiment of the present invention and will be described below in conjunction with FIG. 1.

At step 200 of FIG. 2, multimedia data may be received by electronic device 175 of FIG. 1. For an embodiment in which electronic device 175 is a digital camera, this multimedia data may be a still image. For an embodiment in which electronic device 175 is a video camera, this multimedia data may be a video image (i.e. multiple still images). For an embodiment of the present invention in which the electronic device is a cellular phone or other audio device, the multimedia data may be an audio signal. For another embodiment, the multimedia data may be alphanumeric entries entered on a keypad. For example, for an embodiment in which the electronic device is a cellular phone, the multimedia data may be a phone number. Note that in accordance with an embodiment of the present invention, the electronic device may serve multiple functions, and the multimedia data received at step 200 may depend on the type of function performed by the device.

At step 205 of FIG. 2, a place stamp is determined. This place stamp may be determined, at least in part, by locator 155 of electronic device 175, which includes a component to determine the location of the electronic device. In accordance with one embodiment of the present invention, the place stamp may indicate the approximate location of the electronic device at or near the time the multimedia data is received or stored by the electronic device. For an embodiment of the present invention in which the multimedia data includes an image, the place stamp may indicate the approximate location of the image itself (or a portion thereof). For this embodiment, locator 155 may additionally include a component to determine a distance between the electronic device and the image being photographed or videotaped. For example, locator 155 may include a sonar or radar system. By reconciling the location of the electronic device with the distance between the electronic device and the image, the approximate location of the image may be determined.

For an embodiment in which locator 155 includes a GPS, the place stamp may include latitude and longitude information. For an alternate embodiment in which locator 155 includes an alternate positioning system, the place stamp may include other location information relative to one or more known, fixed points, such as cellular phone antennas.

At step 210 of FIG. 2, the multimedia data and place stamp are stored in memory 165 of electronic device 175. Storing the data and place stamp in memory may be done in response to a triggering event such as when the user presses a button on a camera to take a picture or video or when a user presses a send button on a cellular phone. The place stamp associated with the multimedia data may be determined and stored before, during, or after the storing of the multimedia data. For an embodiment of the present invention in which the multimedia data received and stored is extended over a period of time (e.g. for a video or audio stream), a single place stamp may be stored or multiple place stamps may be stored at approximately regular or irregular intervals during the storing of the multimedia data.

After the multimedia data and place stamp have been stored on the electronic device, the user may couple the electronic device to a computer system to download the multimedia data and place stamp to the computer system at step 215 of FIG. 2. This downloading may be done via port 170 of electronic device 175 of FIG. 1. The coupling between port 170 and hub 125 may be a wired or wireless connection. One purpose for downloading the place stamp to the computer system is to allow the computer system to convert the place stamp to a more useful, descriptive, nomenclature format, as described in more detail below.

For an alternate embodiment of the present invention, the electronic device may be capable of performing this place stamp conversion and storing the results locally. For this embodiment, step 215 of FIG. 2 may be skipped. For example, for an embodiment in which a place stamp indicates the location of a cellular phone when a call is placed or received, program code executed by the cellular phone may access wireless services to convert the place stamp into a descriptive, nomenclature format. This converted place stamp may then be stored in the cellular phone as part of a call log, allowing a user to determine not only what calls have been placed or received but also where the user was located when the calls were placed or received.

At step 220 of FIG. 2, the place stamp is converted from a first format to a second format. The first format may include, for example, latitude and longitude information or other distance information relative to one or more fixed points. The second format may include, for example, descriptive nomenclature information such as country, state, city, street, or address names or numbers. The second format may alternatively include information regarding distances and directions (e.g. north, south, east, or west) from identified geographical points.

To convert the place stamp from the first format to the second format, the computer system may access a remotely located server, e.g. via the Internet, containing a lookup table to enable the conversion. Alternatively, such a lookup table may reside locally within the computer system.

After the place stamp is converted into the second format at step 220 of FIG. 2, it is stored in the second format at step 225. The place stamp in the second format may be stored in place of or in addition to the place stamp in the first format. For one embodiment of the present invention, the place stamp may be stored in a file separate from the file containing the multimedia data. For an alternate embodiment, the place stamp may be stored within the same file containing the multimedia data.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A system comprising:
   an input component to receive an image, the input component including a lens of a digital camera or video camera, and the image is a still or video image, respectively;
   a locator to provide a place stamp associated with the image; memory, wherein the locator includes a global positioning system;
   a component to determine a distance between the system and at least a portion of the image and
   a processor to store the image and the place stamp in the memory in response to a triggering event, wherein the place stamp includes an indication of a latitude and longitude of the system or of the image.

2. The system of claim 1, wherein the triggering event is the pressing of a button to take a picture or video.

3. A method comprising:
   providing a handheld camera with a locator to provide a place stamp, wherein the locator includes integrating a global positioning system into the camera;
   enabling a user of the camera to store the place stamp associated with an image captured by the user using the camera, including providing the camera with a button to take a picture or video and to automatically store the place stamp;
   providing the camera with an output port and software, the output port to download the image and the place stamp to a computer system, the software, when executed by the computer system, to convert the place stamp from a first format to a second format, wherein the first format includes latitude and longitude information, and the second format includes nomenclature information.

4. A machine-readable medium including machine-readable instructions that, if executed by a computer system, cause the computer system to perform a method comprising:
   downloading an image and a place stamp associated with the image from a camera;
   converting the place stamp from a first format into a second format, wherein the first format includes latitude and longitude information, and the second format includes nomenclature information;
   accessing a remotely located server via an internet, and converting latitude and longitude information into nomenclature information, wherein the nomenclature information includes a city name; and
   storing the image and the place stamp in the second format.

5. A system comprising:
   an input component to receive audio or video data;
   a locator to provide a place stamp associated with the audio or video data, the locator includes a global positioning system; memory;
   a processor to store the audio or video data and the place stamp in the memory; and
   program code that, when executed, causes the system to convert the place stamp from latitude and longitude information into nomenclature information.

* * * * *

UNITED STATES PATENT AND TRADEMARK OFFICE
CERTIFICATE OF CORRECTION

| | | |
|---|---|---|
| PATENT NO. | : 6,943,825 B2 | Page 1 of 1 |
| APPLICATION NO. | : 10/017723 | |
| DATED | : September 13, 2005 | |
| INVENTOR(S) | : Kelan C. Silvester | |

It is certified that error appears in the above-identified patent and that said Letters Patent is hereby corrected as shown below:

In the Claims:

Claim 1, Column 4, line 14, "image; memory, wherein" should read: --image, wherein--.
Claim 1, Column 4, after line 15, add a new line which reads: --memory;--.
Claim 5, Column 4, line 60, "positioning system; memory;" should read (with a new line added after "system;"):
--positioning system;
memory;--.

Signed and Sealed this
Fourteenth Day of January, 2014

Michelle K. Lee
*Deputy Director of the United States Patent and Trademark Office*